United States Patent [19]
Higashihara et al.

[11] Patent Number: 5,980,122
[45] Date of Patent: Nov. 9, 1999

[54] LIGHT BLOCKING APPARATUS FOR A CAMERA

[75] Inventors: Masaki Higashihara; Hideo Tamamura; Etsuro Suzuki; Hiroyuki Kasuga, all of Kanagawa-ken; Hidetoshi Matsuoka, Tokyo; Motoo Kumagai; Akihisa Horiuchi, both of Kanagawa-ken; Jun Makino; Hiroyuki Asada, both of Tokyo, all of Japan

[73] Assignee: Canon Kabushiki Kaisha, Tokyo, Japan

[21] Appl. No.: 08/861,911

[22] Filed: May 22, 1997

Related U.S. Application Data

[63] Continuation of application No. 08/490,328, Jun. 14, 1995, abandoned.

[30] Foreign Application Priority Data

Jun. 20, 1994 [JP] Japan .................................. 6-137407
May 26, 1995 [JP] Japan .................................. 7-128141
Jun. 8, 1995 [JP] Japan .................................. 7-141922

[51] Int. Cl.⁶ ............................ C03B 19/12; C03B 19/26
[52] U.S. Cl. ......................... 396/354; 396/355; 396/494
[58] Field of Search .................................. 396/354, 355, 396/494

[56] References Cited

U.S. PATENT DOCUMENTS

| | | | |
|---|---|---|---|
| 4,348,088 | 9/1982 | Yamamichi et al. | 354/152 |
| 4,492,453 | 1/1985 | Hiramatsu | 354/479 |
| 4,508,439 | 4/1985 | Chara et al. | 354/154 |
| 4,673,278 | 6/1987 | Fukuda et al. | 354/479 |
| 4,730,200 | 3/1988 | Kitazawa | 354/152 |
| 4,941,010 | 7/1990 | Aihara et al. | 354/407 |

*Primary Examiner*—Eddie C. Lee
*Attorney, Agent, or Firm*—Robin, Blecker & Daley

[57] ABSTRACT

A camera includes a fixed first mirror for both reflecting a light flux and transmitting the light flux therethrough, a second mirror for reflecting a part of the light flux transmitted through the first mirror toward a particular device, the second mirror being capable of moving between a non-exposure position and a mirror-retracted position, and a light blocking member movable in interlocked relationship to a movement of the second mirror in such a manner that, when the second mirror is located at the non-exposure position, the light blocking member is located at a light blocking position at which the light blocking member blocks at least a part of the light flux transmitted through the first mirror, and, when the second mirror is retracted to the mirror-retracted position, the light blocking member moves to a retracted position at which the light blocking member is retracted from the light blocking position.

10 Claims, 13 Drawing Sheets

LIGHT BLOCKING APPARATUS FOR A CAMERA

This is a continuation application under 37 CFR 1.62 of prior application Ser. No. 08/490,328 filed on Jun. 14, 1995 (abandoned).

BACKGROUND OF THE INVENTION

1. Field of the Invention

The present invention relates to a camera having a light blocking device.

2. Description of the Related Art

It has heretofore been proposed to provide a camera which is arranged to divide a light flux exiting from a photographic lens into two light fluxes by means of a half-mirror and conduct the two light fluxes in different directions, one being conducted in a direction in which to expose film and to detect focus of the photographic lens and the other toward a viewfinder or an image pickup element.

FIG. 4 is a diagrammatic cross-sectional view showing the central portion of a single-lens reflex camera having a fixed half-mirror, which camera is disclosed in Japanese Laid-Open Patent Application No. Hei 2-89039. In the shown central portion, a light flux indicative of an image of a subject exiting from a photographic lens (not shown) is divided into two light fluxes to be respectively conducted toward a viewfinder system and a film plane, by means of a semi-transparent fixed mirror 1. The fixed mirror 1 is mounted on a mirror frame 2 by adhesion.

A sub-mirror 7 is provided for conducting the light flux transmitted through the fixed mirror 1, toward a focus detecting device 30. The sub-mirror 7 is mounted on a sub-mirror mount 8 by adhesion, and the sub-mirror mount 8 is supported for rotation about a shaft 9 by a mirror driving plate 10.

When the camera is in its photography standby state, the sub-mirror mount 8 is urged clockwise by a spring 14 and is held at a predetermined position by a stopper 15, as shown in FIG. 4.

When a photographic (exposure) cycle is started, the mirror driving plate 10 starts to rotate clockwise about a shaft 11 and the sub-mirror mount 8 also starts to move down toward the bottom of a mirror box. When approaching the bottom of the mirror box, the sub-mirror mount 8 is urged counterclockwise by a spring 17. The sub-mirror mount 8 continues to move down against the counterclockwise urging force of the spring 17, and when the sub-mirror mount 8 reaches its lower position, the sub-mirror 7 is placed into a retracted state in which it is held approximately in parallel with the bottom of the mirror box.

A sub-mirror driving mechanism using a conventional fixed half-mirror is constructed as described above in brief.

In the above-described conventional construction, a portion of the light flux transmitted through the semi-transparent fixed mirror 1 is blocked by the sub-mirror 7, while the other portion of the light flux reaches a shutter curtain 18. For this reason, the light blocking performance of the shutter curtain 18 needs to be higher than those of conventional general single-lens reflex cameras. To increase the light blocking performance of the shutter curtain 18, it is customary to adopt a double light blocking system in which both leading and trailing curtains of a shutter are used to block light.

However, to achieve such double light blocking, it is necessary to prepare an exclusive shutter having a complicated mechanism and an exclusive control program for controlling such exclusive shutter. As a result, the operation of the shutter is complex so that the probability of occurrence of faults increases, and the shutter or the camera becomes expensive.

If a general focal plane shutter is employed, it will be impossible to fully block the incidence of light from the photographic lens on the film plane. As a result, stray light may enter the film plane to adversely affect photography.

SUMMARY OF THE INVENTION

It is, therefore, one object of the present invention to provide a camera which includes a fixed first mirror for both reflecting a light flux exiting from a photographic lens and transmitting the light flux therethrough, a movable second mirror for reflecting the light flux transmitted through the first mirror, and a light blocking member movable in interlocked relationship to a movement of the second mirror between a position at which to block at least a part of the light flux to be made incident on a recording medium and a position at which to allow the light flux to be made incident on the recording medium.

The above and other objects of the present invention will become apparent from the following detailed description of preferred embodiments of the present invention, taken in conjunction with the accompanying drawings.

DETAILED DESCRIPTION OF THE PREFERRED EMBODIMENTS

Figure 1:
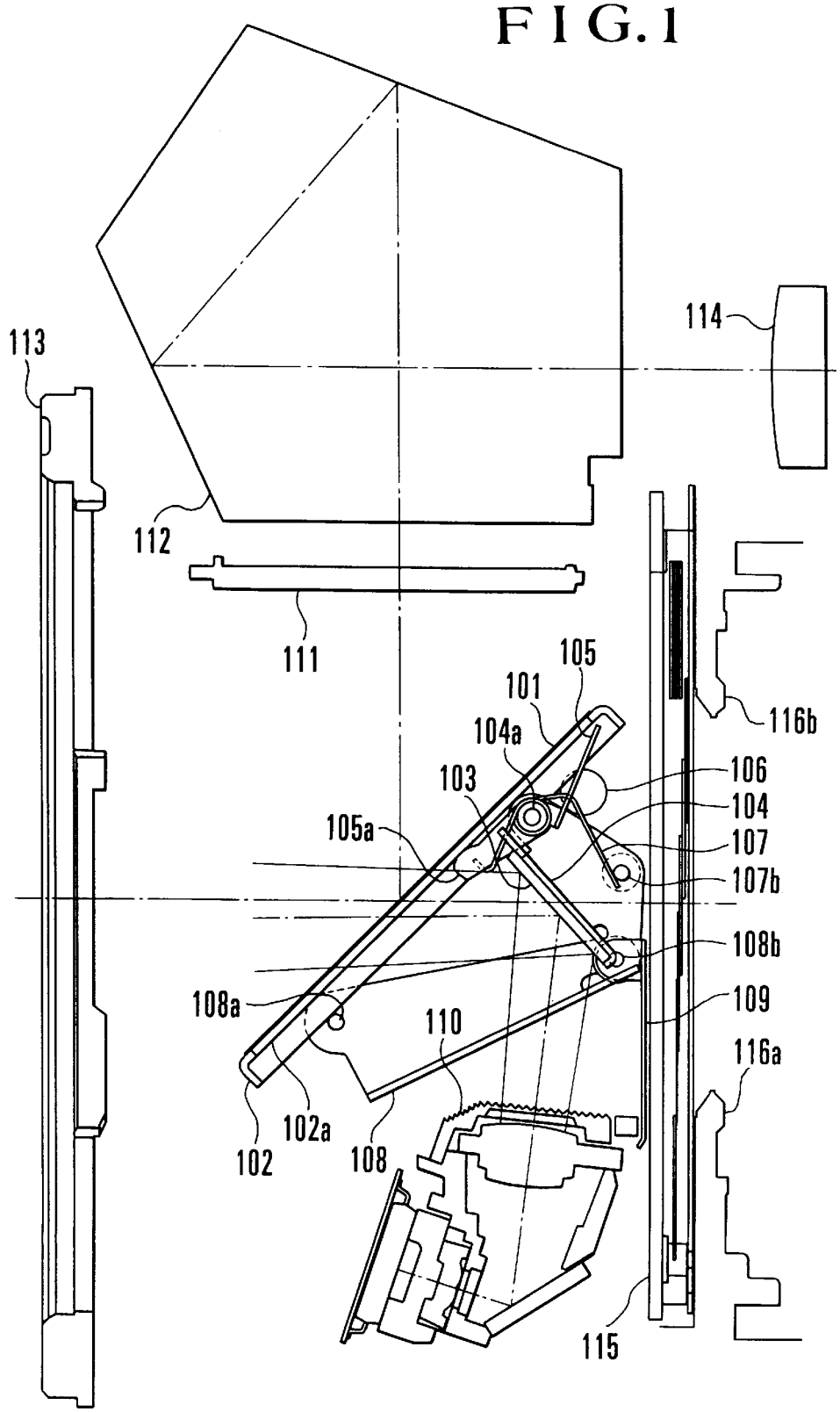
FIG. 1 is a diagrammatic cross-sectional view showing the layout of essential constituent elements in a camera according to a first embodiment of the present invention.
Figure 2:
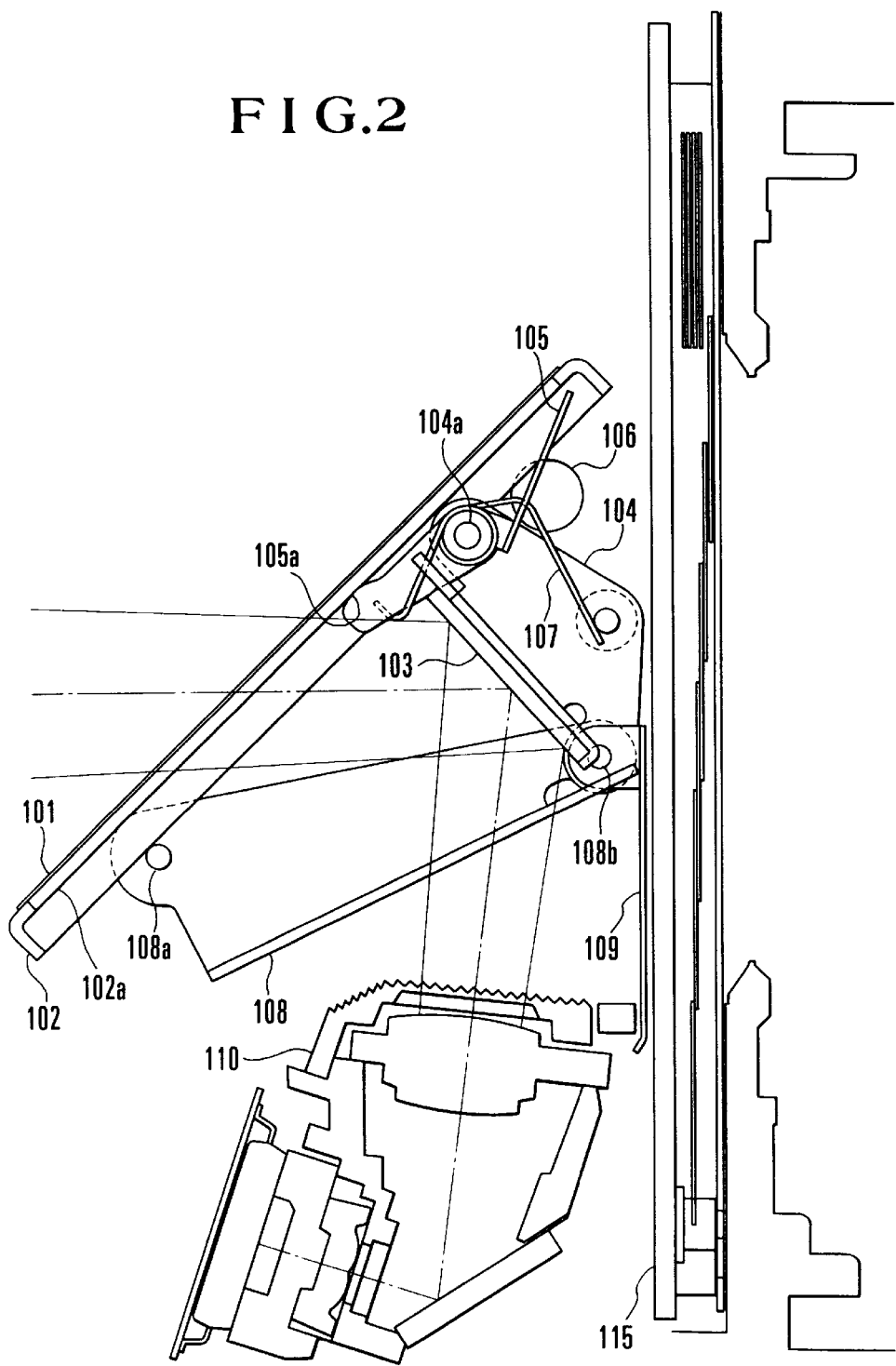
FIG. 2 is an enlarged cross-sectional view showing the operations of a sub-mirror and light blocking members in the first embodiment.
Figure 3:
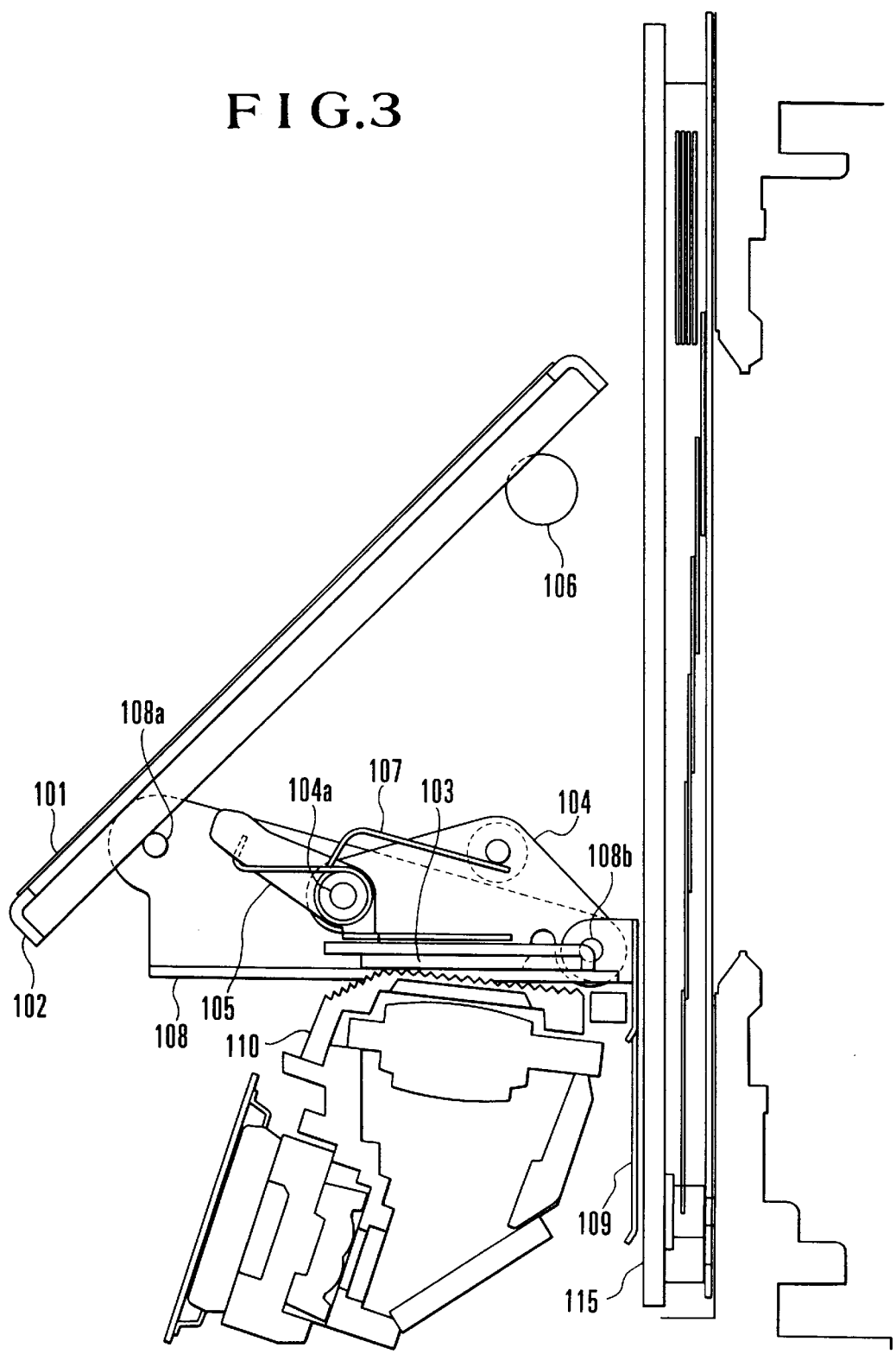
FIG. 3 is an enlarged cross-sectional view showing the operations of the sub-mirror and the light blocking members in the first embodiment.
Figure 4:
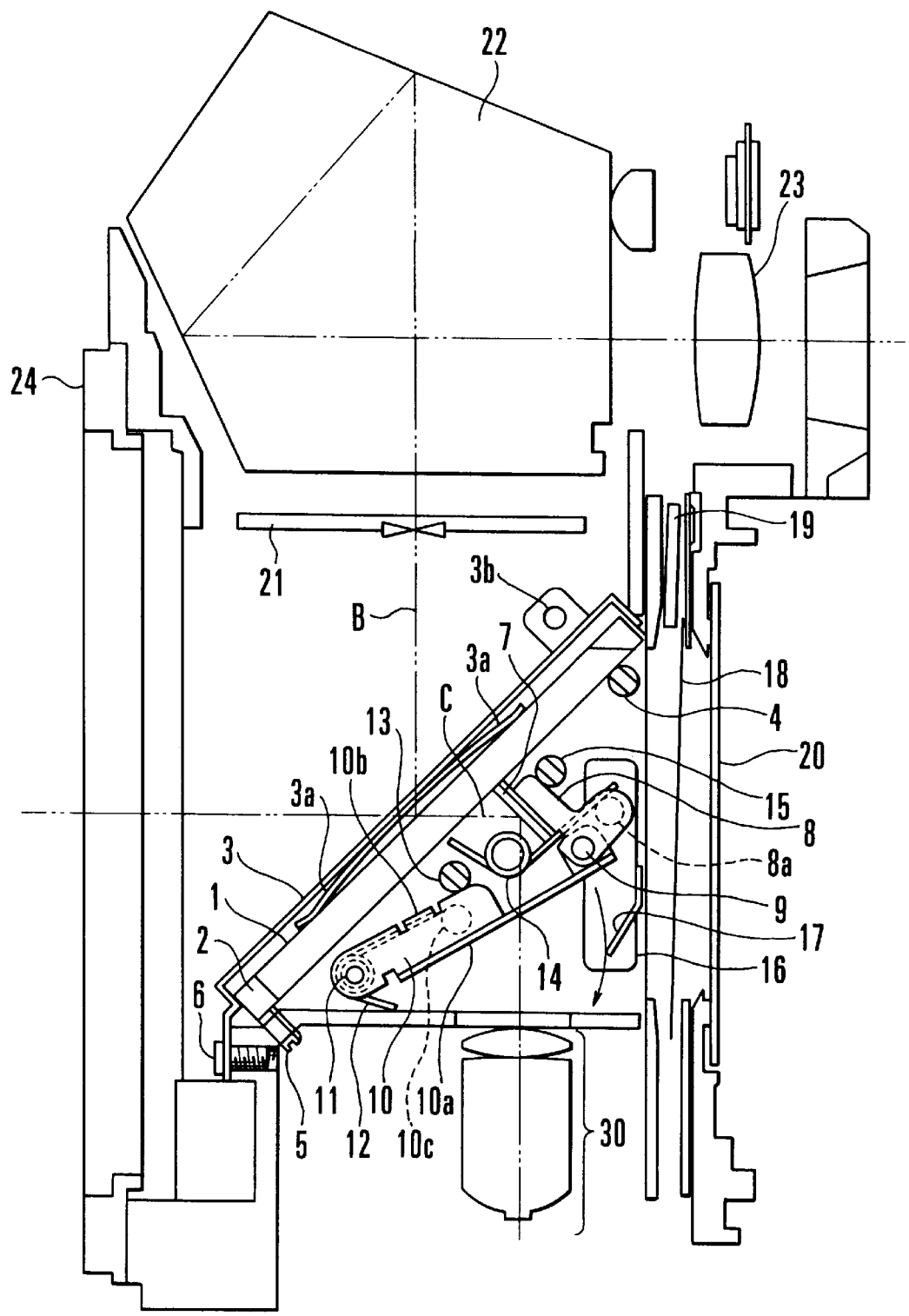
FIG. 4 is a diagrammatic cross-sectional view showing a related-art example.

FIGS. 1 to 3 are explanatory diagrammatic views showing a first embodiment of the present invention which is used in a single-lens reflex camera having a fixed main mirror as a first mirror.

FIG. 1 is a diagrammatic cross-sectional view showing the central portion of the single-lens reflex camera in which a sub-mirror 103 which will be described later is placed in its photography standby state. In the shown central portion, a light flux exiting from a photographic lens (not shown) is divided into two light fluxes to be respectively conducted toward a viewfinder system and a film plane, by means of a semi-transparent fixed mirror 101 of film-like shape. The fixed mirror 101 is mounted on a mirror frame 102 by adhesion. The sub-mirror 103 serves as a second mirror for conducting the light flux transmitted through the fixed mirror 101, toward a focus detecting device 110, and is fixed to a sub-mirror mount 104 by adhesion. The light flux which advances toward the viewfinder system forms a subject image on the diffusion face of a focusing screen 111, and a photographer can observe the subject image through a pentagonal prism 112 and an eyepiece lens 114.

The sub-mirror mount 104 is supported for rotation about a shaft 108b by a lever 108, and the lever 108 is supported for rotation about a shaft 108a in a mirror box. The light flux which advances toward a shutter 115 is blocked by a light blocking lever 105 and a light blocking plate 109 which each constitute part of a light blocking member.

The operations of the shown light blocking device and the sub-mirror 103 will be described below with reference to FIGS. 2 and 3. FIG. 2 is an enlarged cross-sectional view showing the photography standby state of the sub-mirror 103. The light blocking lever 105 is supported for rotation about a shaft 104a of the sub-mirror mount 104 and is urged clockwise by a spring 107. An abutment face 105a of the light blocking lever 105 is held in abutment with a back face 102a of the fixed mirror frame 102 as shown in FIG. 2. A light flux which passes toward the shutter 115 through an area above the sub-mirror mount 104 is blocked by the light blocking lever 105.

The sub-mirror mount 104 is maintained in abutment with a stopper 106 by being urged clockwise by a spring (not shown), whereby the sub-mirror 103 is held at a predetermined angle.

The light blocking plate 109 is supported for rotation about the shaft 108b of the lever 108. A light flux which passes toward the shutter 115 through an area below the sub-mirror mount 104 is blocked by the light blocking plate 109. Since the light flux to be made directly incident on the shutter 115 is blocked in the above-described manner, it is not necessary to take measures, such as double light blocking for improving the light blocking performance of the shutter 115. Accordingly, the shutter curtains of the shutter 115 are prevented from being heated to high temperatures, whereby it is possible to extend the range of selection of materials for the shutter curtains. These advantages provide a merit which makes it possible to use a currently marketed low-cost shutter or a high-speed shutter in a single-lens reflex camera having a fixed main mirror.

FIG. 3 is a view showing the state of photography in which the sub-mirror 103 is retracted in the direction of the bottom of the mirror box.

As the lever 108 is rotated clockwise about the shaft 108a by a driving mechanism (not shown), the sub-mirror mount 104 is rotated counterclockwise about the shaft 108b in interlocked relationship to the clockwise rotation of the lever 108. Since the driving mechanism of the sub-mirror mount 104 is substantially identical to the conventional example, the description thereof is omitted for the sake of simplicity.

Since the light blocking plate 109 is held by the lever 108 via the shaft 108b, the light blocking plate 109 is retracted downward with the rotation of the lever 108, and is accommodated into the space between the focus detecting device 110 and the shutter 115.

The light blocking lever 105 separates from the fixed mirror frame 102 and is released from the abutment with the fixed mirror frame 102. Accordingly, the light blocking lever 105 is rotated clockwise about the shaft 104a by the spring 107, whereby a light blocking portion of the light blocking lever 105 is placed into a retracted state in which it is held approximately in parallel with the bottom of the mirror box, as shown in FIG. 3. In this manner, the sub-mirror 103 and the light blocking member (105 and 109) are retracted from a photographic optical path, and photography is carried out.

As is apparent from the above description, in accordance with the first embodiment, there is provided an arrangement which includes a first mirror for both reflecting a light flux exiting from a photographic lens and transmitting the light flux therethrough, a second mirror for reflecting the light flux transmitted through the first mirror, the second mirror being capable of operating independently of the first mirror, and a light blocking member movable in interlocked relationship to an operation of the second mirror between a position at which to block at least a part of the light flux transmitted through the first mirror which is to be made incident on a recording medium and a position at which to allow the light flux to be made incident on the recording medium. Accordingly, with the above-described simple arrangement, it is possible to block light to be made incident on the recording medium such as film, thereby preventing incorrect exposure of the recording medium.

In addition, in accordance with the first embodiment, there is provided an arrangement which includes a first mirror fixed in a camera for both reflecting a light flux exiting from a photographic lens and transmitting the light flux through the first mirror, a second mirror movably supported for reflecting the light flux transmitted through the first mirror, and a light blocking member movable in interlocked relationship to an operation of the second mirror between a position at which to block at least a part of the light flux transmitted through the first mirror which is to be made incident on a recording medium and a position at which to allow the light flux to be made incident on the recording medium. Accordingly, even in a camera of the type in which the first mirror is fixed in the camera itself, it is possible to block light transmitted through the first mirror which is to be made incident on the recording medium, by using the aforesaid simple arrangement which does not use a special shutter assembly of the conventional type which needs double light blocking. Accordingly, it is possible to prevent incorrect light from being made incident on the recording medium.

Further, the second mirror moves in the direction of the bottom of the camera, and at least a part of the light blocking member moves to a light-blocking cancel position lower than a retracted position at which the second mirror finishes moving in the direction of the bottom. Accordingly, the light blocking member is prevented from adversely affecting the process of recording a subject image on the recording medium.

Similarly, the second mirror moves in the direction of the bottom of the camera, and at least a part of the light blocking member moves to the light-blocking cancel position approximately parallel to the retracted position at which the second mirror finishes moving in the direction of the bottom. Accordingly, the light blocking member is prevented from adversely affecting the process of recording a subject image on the recording medium.

Further, since the light blocking member is divided into a plurality of parts, not only is it possible to block light over a wide area, but also the light blocking member can be retracted into a small space during a light-blocking cancel period. Accordingly, the freedom of design can be enlarged, whereby it becomes possible to block light to be made incident on the recording medium, without increasing the entire size of the camera.

Figure 5:
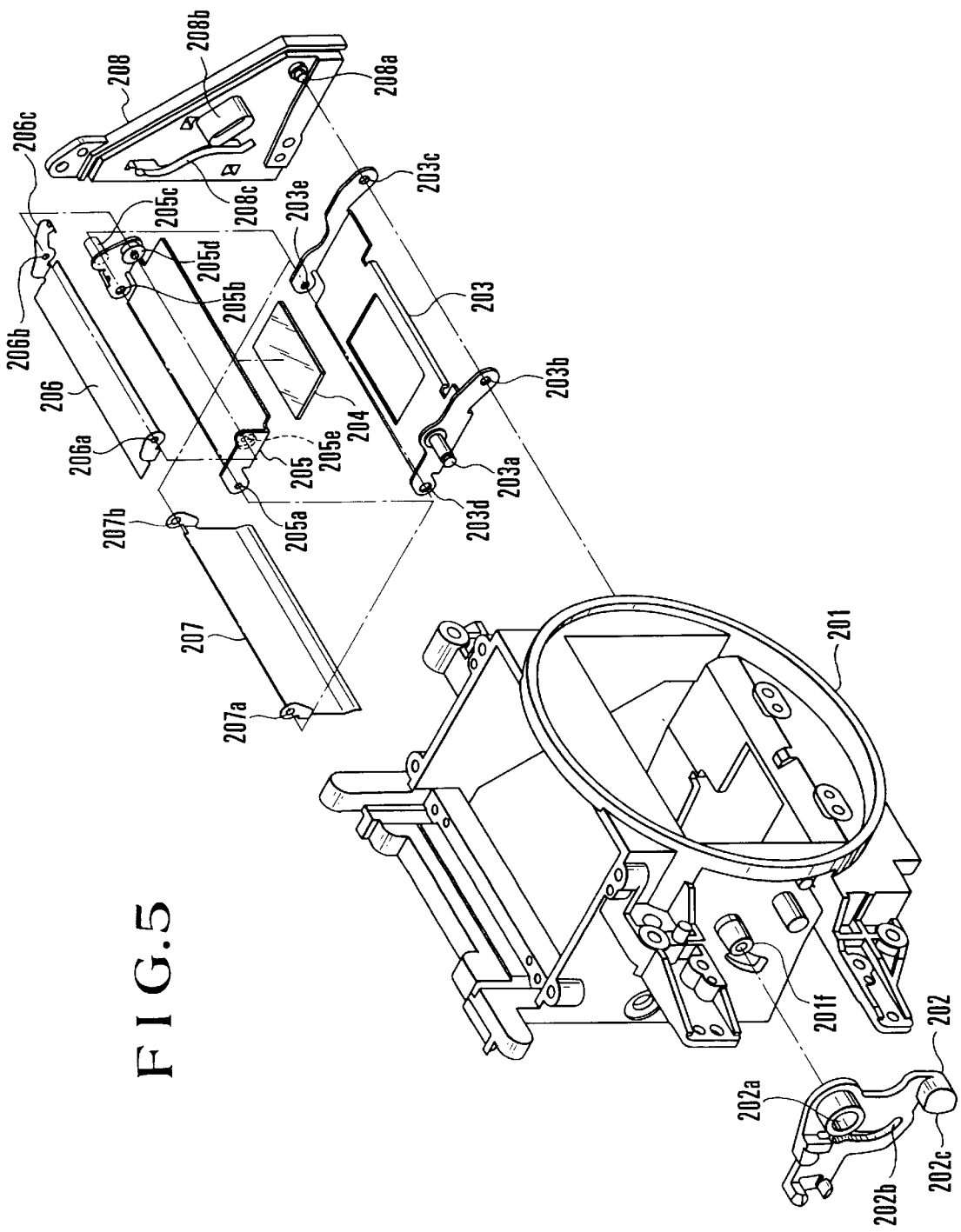
FIG. 5 is an exploded perspective view showing a mirror driving device for a camera according to a second embodiment of the present invention.

FIG. 5 is an exploded perspective view showing a mirror driving device for a camera according to a second embodiment of the present invention. The mirror driving device is assembled in a front plate 201 which forms a mirror box. A driving lever 202 is supported for rotation about a shaft 201f of the front plate 201 via a shaft hole 202a, and drives a lever 203 by means of a cam slot 202b and also performs shutter charging.

The lever 203 is supported at hinge portions 203b and 203c for swinging movement about a shaft 208a of a base plate 208 and a shaft (not shown) provided in the mirror box formed by the front plate 201, and a driving pin 203a of the lever 203 is arranged to swing while sliding in the cam slot 202b of the driving lever 202.

A sub-mirror 204 is fixed to the bottom face of a sub-mirror mount 205 by adhesion. The sub-mirror mount 205 is supported at hinge portions 205a and 205b for swinging movement with respect to hinge portions 203d and 203e of the lever 203. A second light blocking member 207 is also supported at hinge portions 207a and 207b for swinging movement with respect to the hinge portions 203d and 203e of the lever 203.

A driving pin 205c of the sub-mirror mount 205 moves in a cam slot 208c of the base plate 208, thereby enabling the sub-mirror mount 205 to be opened and closed.

A first light blocking member 206 is supported at hinge portions 206a and 206b for swinging movement about hinge shafts 205d and 205e of the sub-mirror mount 205. The first light blocking member 206 is opened and closed by a driving portion 206c and a cam face 208b of the base plate 208.

The arrangement of major components of the mirror driving device is as described above.

Figure 6:
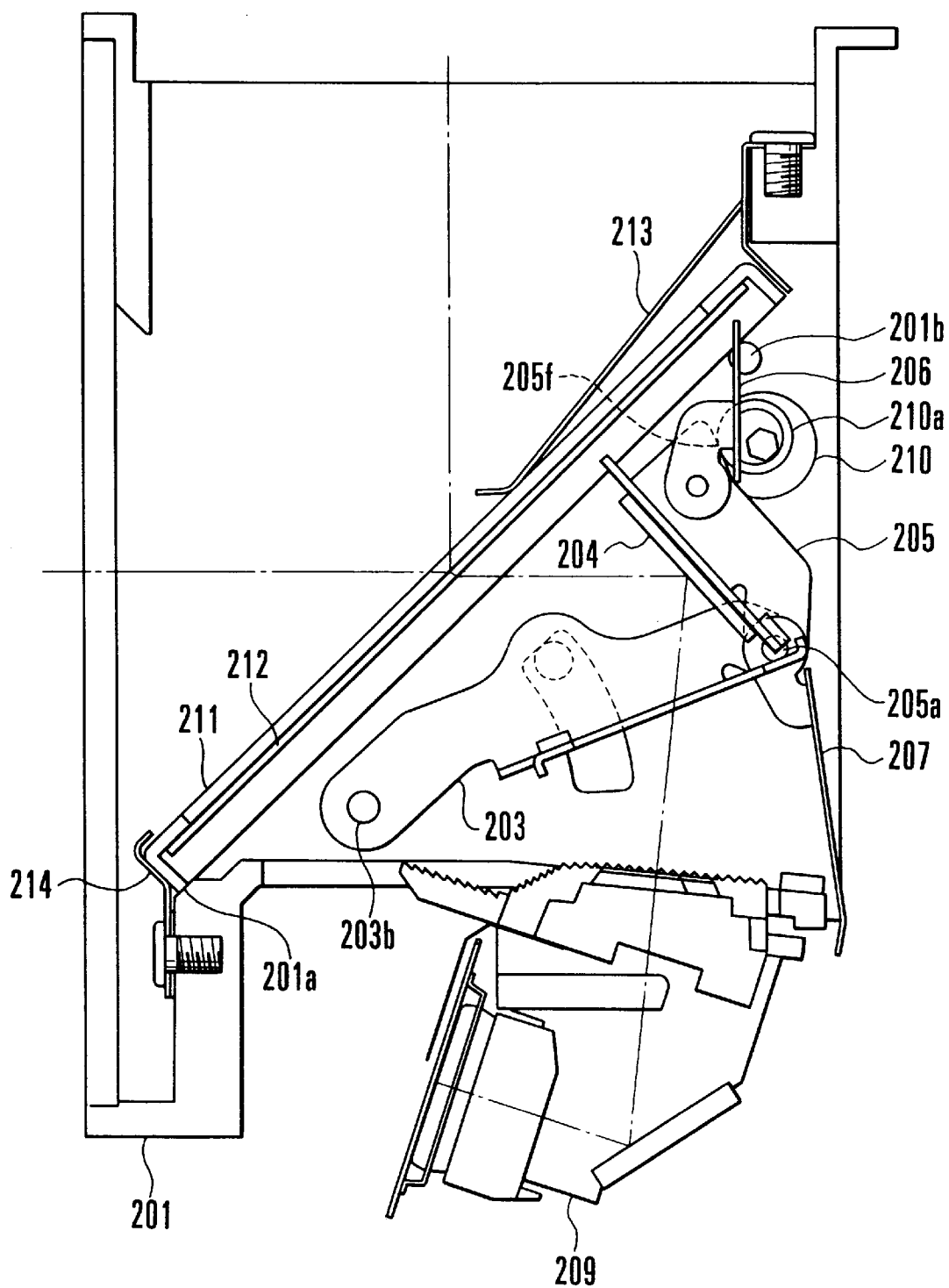
FIG. 6 is a diagrammatic cross-sectional view showing the mirror-up state of the central portion of the camera according to the second embodiment.
Figure 7:
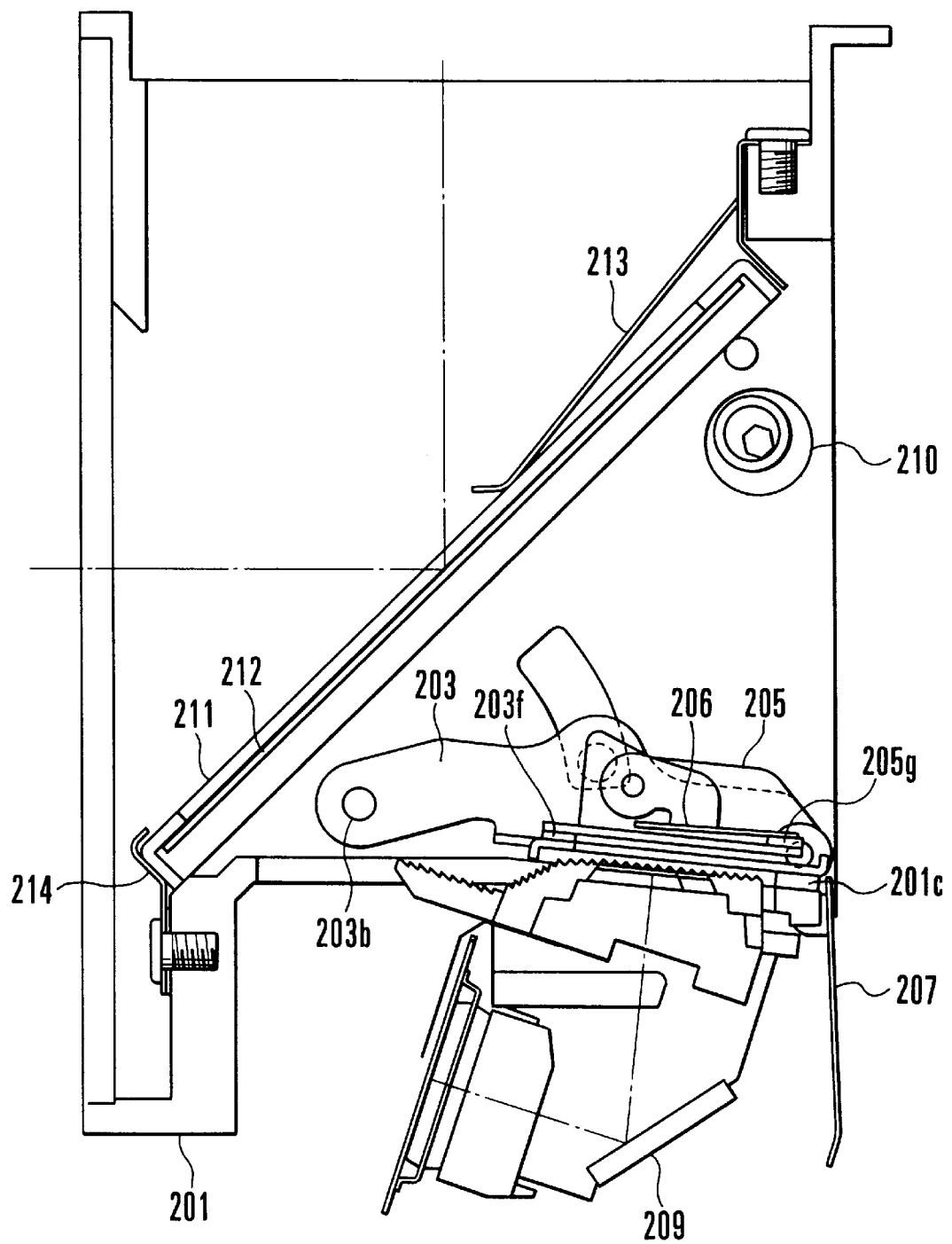
FIG. 7 is a diagrammatic cross-sectional view showing the mirror-down state of the central portion of the camera according to the second embodiment.

FIGS. 6 and 7 are diagrammatic cross-sectional views showing the central portion of the mirror driving device. FIG. 6 shows a mirror-up state (exposure-preventing state), while FIG. 7 shows a mirror-down state (exposure-permitting retracted state).

Referring to FIG. 6, a half-mirror 212 is fixed to the back face of a holding frame 211 by adhesion. The holding frame 211 is positioned and held in abutment with abutment portions 201a and 201b of the front plate 201 by the urging force of a leaf spring 213. The sub-mirror 204 serves to conduct a light flux transmitted through the half-mirror 212 toward a focus detecting device 209 provided below the mirror box. The sub-mirror 204 is arranged so that the light flux can be inclined toward a photographic lens (not shown), and the bottom face of the mirror box and the top face of the focus detecting device 209 are inclined so that they can be approximately perpendicular to the inclined light flux.

The first and second light blocking members 206 and 207 are provided above and below the sub-mirror mount 205 held by the lever 203, respectively. These members serve to prevent a photographic light flux from being made directly incident on a shutter curtain (a shutter blade group) which is not shown, thereby preventing leak of light rays and damage to the shutter curtain.

The sub-mirror mount 205 is supported at the hinge portion 205a for swinging movement with respect to the lever 203. In addition, the sub-mirror mount 205 is spring-urged in the clockwise direction to bring an abutment portion 205f into abutment with an abutment face 210a of a stopper 210, whereby the sub-mirror mount 205 is held at a predetermined angle. The stopper 210 is supported by an eccentric shaft, and the angle of the sub-mirror 204 can be adjusted by rotating the stopper 210.

Referring to FIG. 7, the lever 203, the sub-mirror mount 205 and the first light blocking member 206 can be placed into a retracted state in which they are approximately parallel to the top face of the focus detecting device 209. In this arrangement, the lever 203, the sub-mirror mount 205 and the first light blocking member 206 are retracted in the state of being inclined from the optical axis of the photographic lens. Accordingly, in design, it is possible to dispose the focus detecting device 209 at the highest possible position while retaining room for the photographic light flux in the vicinity of the shutter in which much room would be difficult to retain in a conventional arrangement. Accordingly, it is possible to prevent an increase in the entire size of the camera.

Elastic members are respectively provided on the front plate 201 as an abutment part 201c for bringing the front plate 201 and the lever 203 into abutment with each other, on the lever 203 as an abutment part 203f for bringing the lever 203 and the sub-mirror mount 205 into abutment with each other, and on the sub-mirror mount 205 as an abutment part 205g for bringing the sub-mirror mount 205 and the first light blocking member 206 into abutment with each other. Accordingly, it is possible to reduce shock or noise occurring each time one of the constituent elements collides with another during a mirror retracting operation. In the mirror retracting operation, the second light blocking member 207 is accommodated into the space between the focus detecting device 209 and a shutter unit (not shown).

As is apparent from the above description, according to the aforesaid arrangement, since a sub-mirror unit can be retracted in its inclined state, it is possible to provide a camera having an internal space efficiently utilized. Accordingly, it is possible to achieve a camera in which its sub-mirror unit can be placed into a retracted state free of interference with a photographic light flux, without increasing the entire size of the camera.

Figure 8:
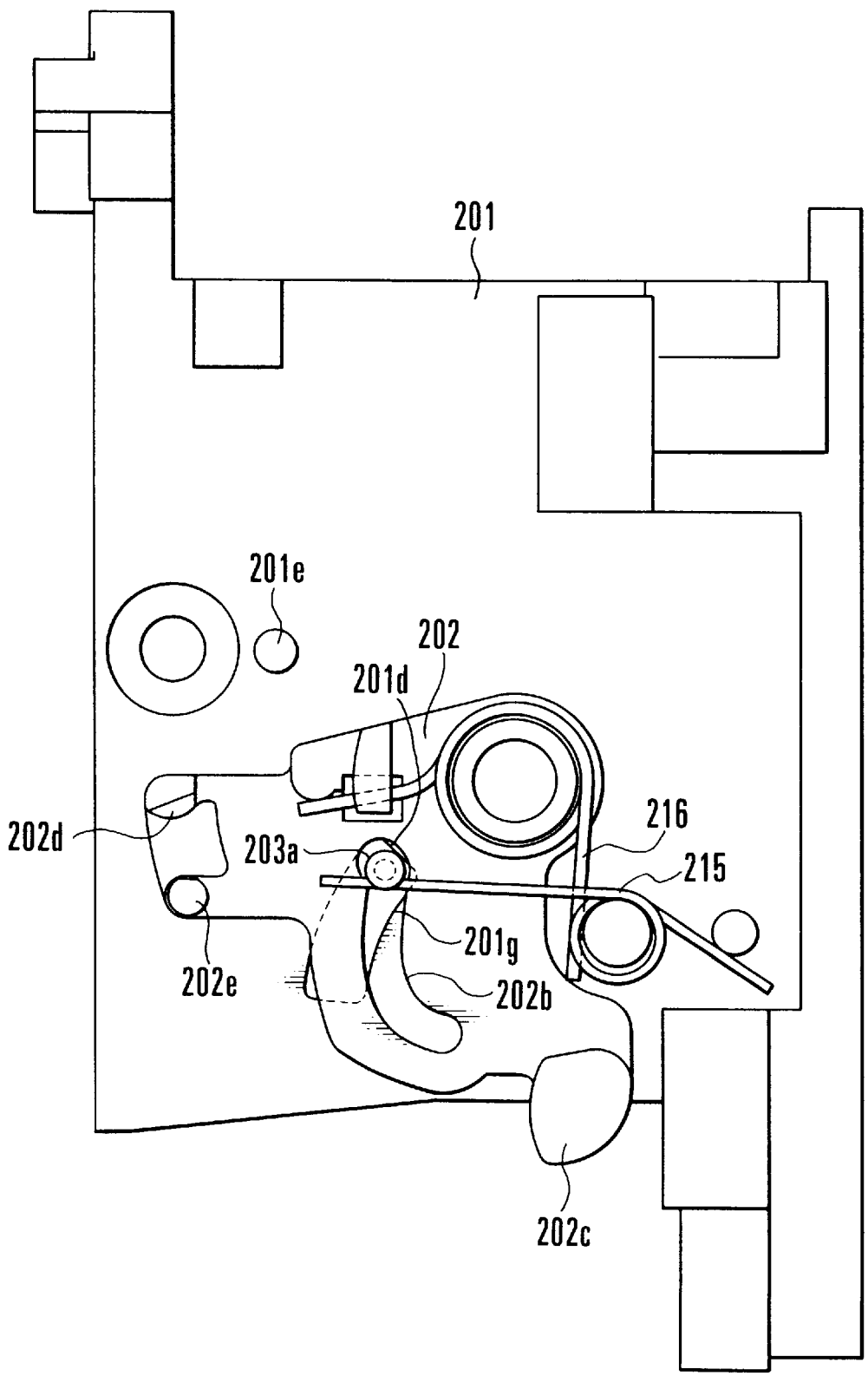
FIG. 8 is a diagrammatic side elevational view showing the mirror-up state of a mirror driving portion of the camera according to the second embodiment.
Figure 9:
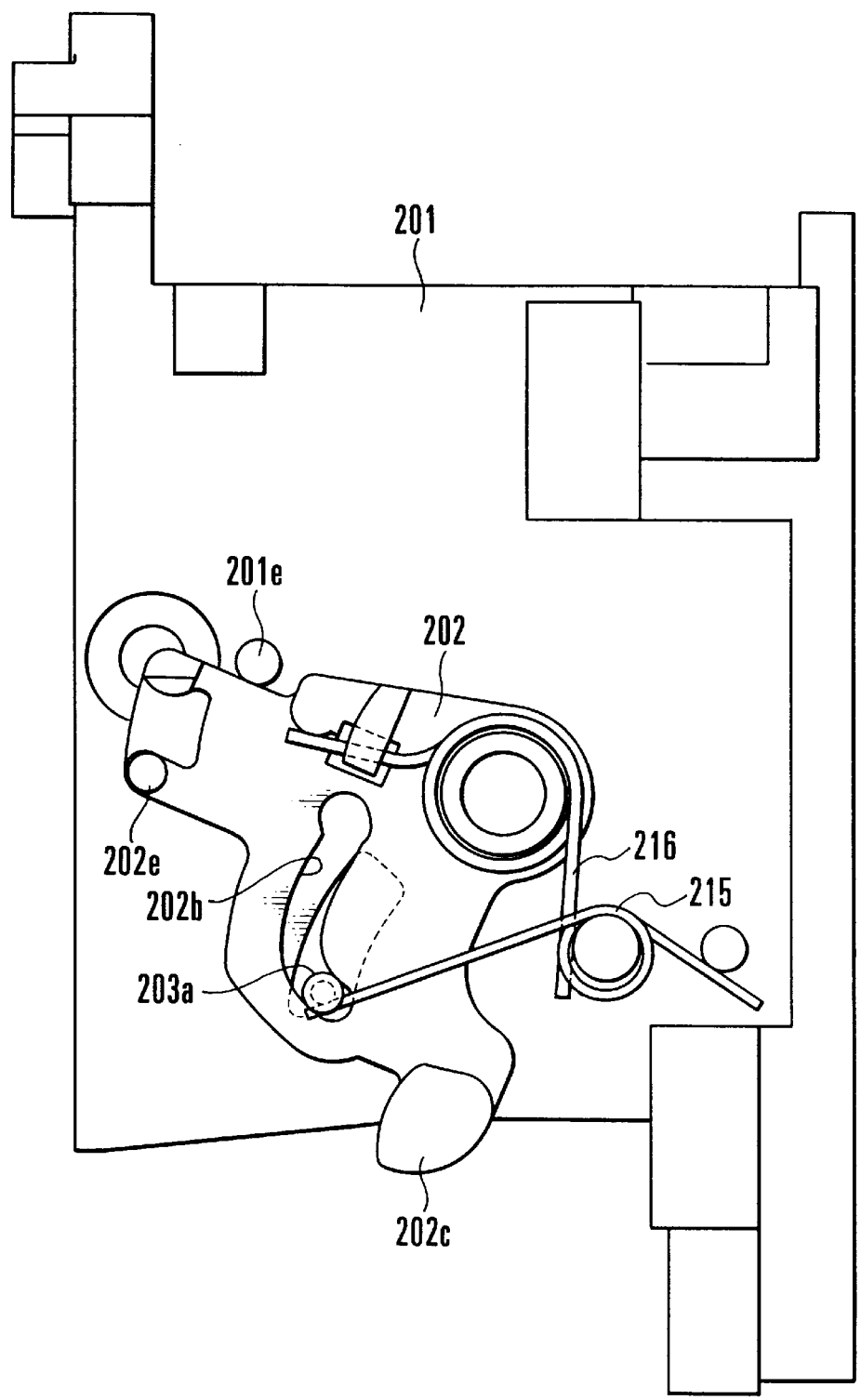
FIG. 9 is a diagrammatic side elevational view showing the mirror-down state of the mirror driving portion of the camera according to the second embodiment.

FIGS. 8 and 9 are diagrammatic side elevational views aiding in explaining a driving part for causing the sub-mirror 204 to move up and down. FIG. 8 shows the mirror-up state, and FIG. 9 shows the mirror-down state.

Referring to FIG. 8, although the driving lever 202 is urged clockwise by a spring 216, a driving part 202c is held at the shown position by a lever (not shown) and the driving lever 202 is held in the shown state. The driving pin 203a of the lever 203 is maintained in abutment with an abutment face 201d of an opening 201g of the front plate 201 by being pressed up by a spring 215, whereby the driving pin 203a is held at its upper position. When the driving lever 202 is held in this state, the shutter (not shown) is charged by a pin 202d.

Referring to FIG. 9, if the driving part 202c of the driving lever 202 is disengaged from the lever (not shown), the driving lever 202 is rotated clockwise by the spring 216, so that the driving lever 202 is brought into abutment with a stopper 201e of the front plate 201 and placed into the shown state. When the driving lever 202 is in the shown state, the driving pin 203a is pressed down along the cam slot 202b to cause the sub-mirror 204 to move down. Since the sub-mirror 204 is driven by means of the cam slot 202b in the above-described manner, the speed at which the sub-mirror 204 is driven can be reduced to an arbitrary speed immediately before the completion of the sub-mirror driving by appropriately setting the cam displacement of the cam slot 202b. Accordingly, it is possible to smoothen the sub-mirror driving and also to reduce shock or noise due to a collision of the constituent elements.

Figure 10:
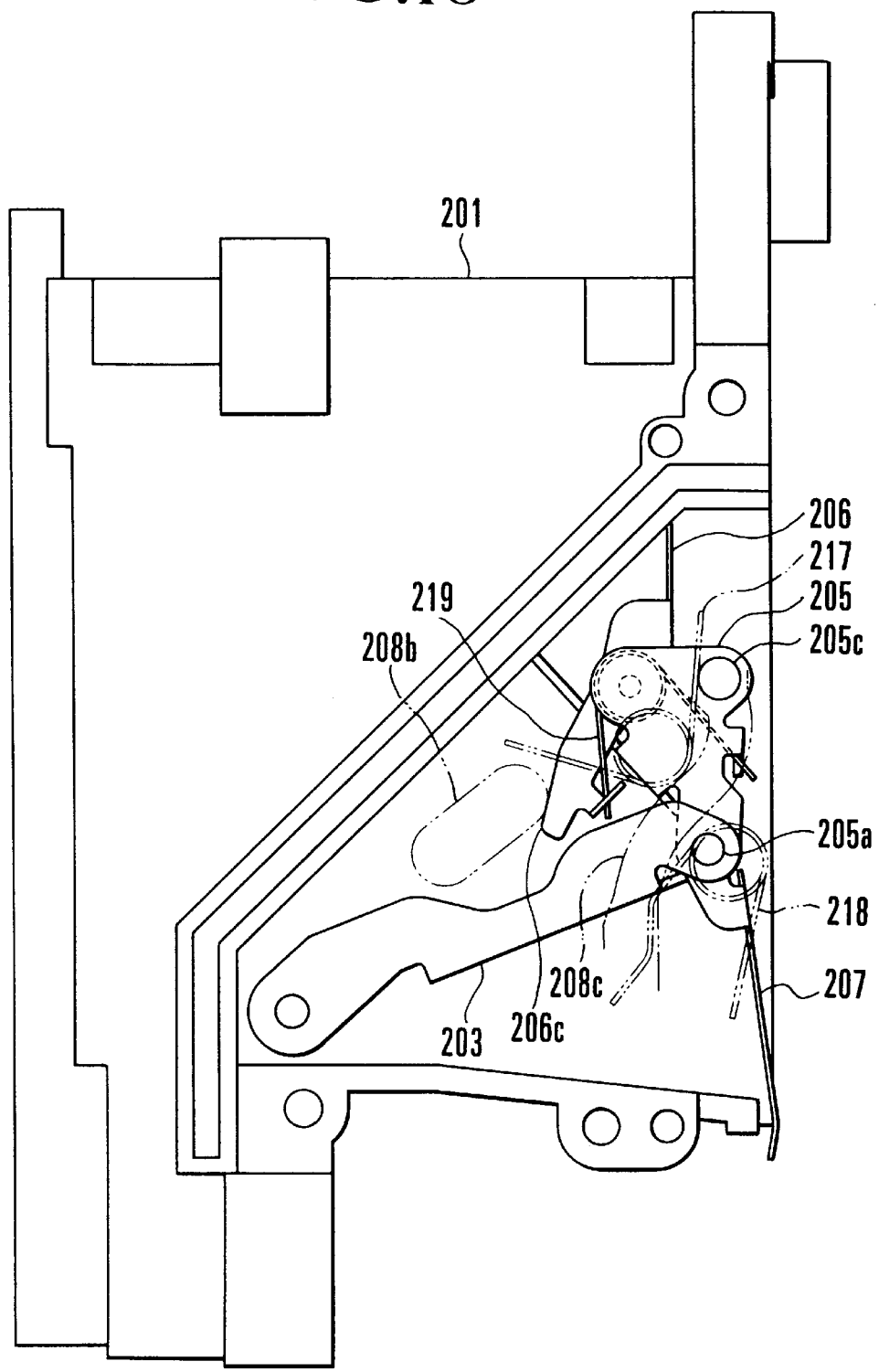
FIG. 10 is a schematic view aiding in explaining the operations of a sub-mirror and light blocking members in the camera according to the second embodiment.
Figure 11:
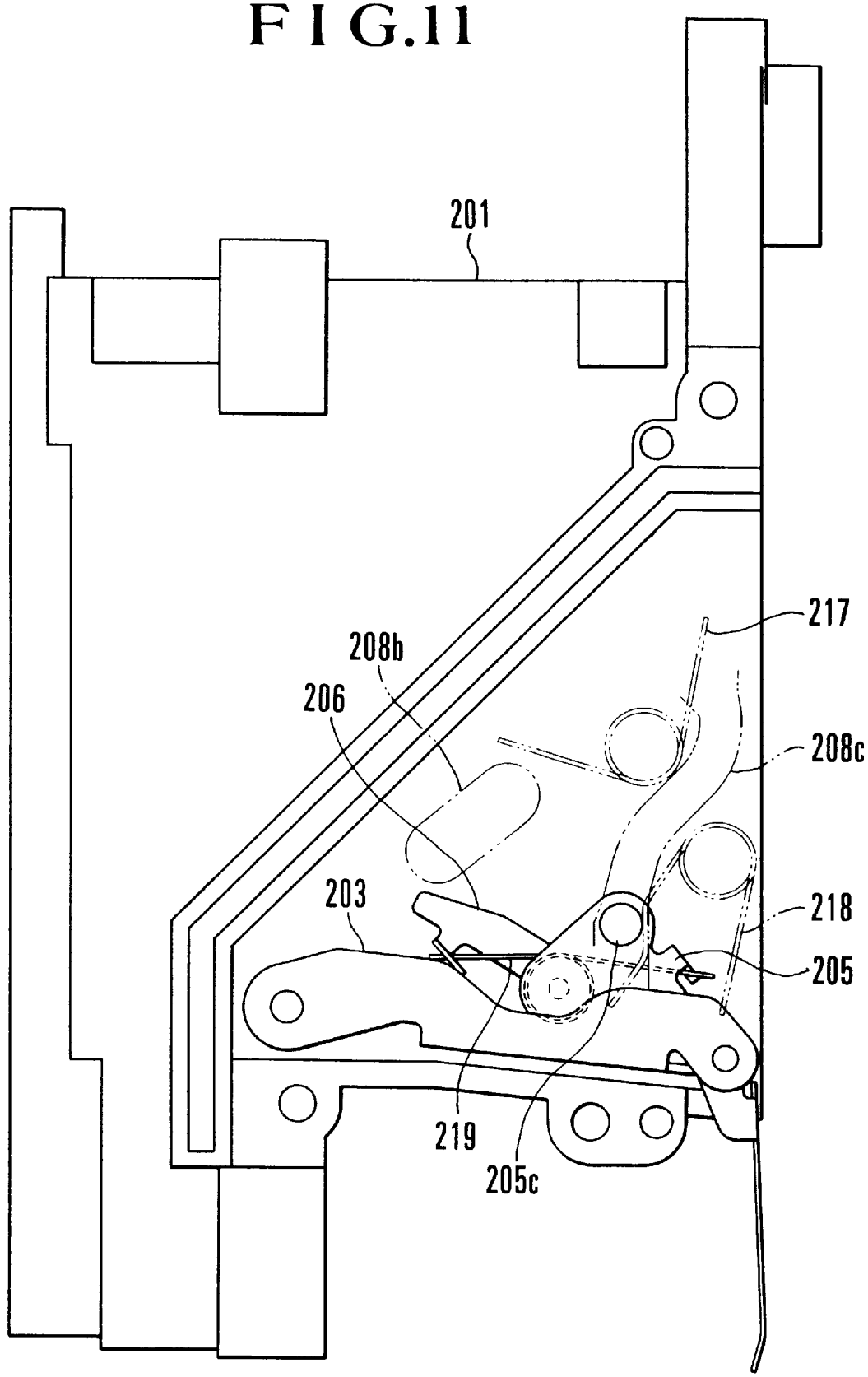
FIG. 11 is a schematic view aiding in explaining the operations of the sub-mirror and the light blocking members in the camera according to the second embodiment.

FIGS. 10 and 11 are diagrammatic views aiding in explaining a driving mechanism for the sub-mirror 204 and the light blocking members 206 and 207. FIG. 10 shows the mirror-up state, and FIG. 11 shows the mirror-down state.

Referring to FIG. 10, the sub-mirror mount 205 is held in the shown state by being urged clockwise by a spring 217. The first light blocking member 206 is urged clockwise with respect to the sub-mirror mount 205 by a spring 219, and is held in the shown state by the driving portion 206c being brought into abutment with the cam face 208b of the base plate 208. The reaction produced in the portion of the driving portion 206c which is brought into abutment with the cam face 208b acts on a portion above the hinge portion 205a of the sub-mirror mount 205, so that the reaction acts as a force which opens the sub-mirror mount 205.

For this reason, it is not necessary to excessively strengthen the spring force of the spring 217, so that it is possible to prevent problems such as the occurrence of deformation in the sub-mirror mount 205 or the instability of the stop position of the sub-mirror mount 205.

Referring to FIG. 11, the first light blocking member 206 is urged clockwise by the spring 219, so that the first light blocking member 206 is retracted and closed in the state of overlying the sub-mirror mount 205. The driving pin 205c of the sub-mirror mount 205 is moved along the cam slot 208c of the base plate 208 to the vicinity of the retracted position at which the sub-mirror mount 205 stops moving, so that the sub-mirror mount 205 is retracted and closed in the state of overlying the lever 203. The sub-mirror mount 205 is held at the retracted position by being urged counterclockwise by a spring 218.

Since the operation of opening and closing the sub-mirror mount 205 and the first light blocking member 206 is realized by the cam slot 208c and the cam face 208b, the speed at which the sub-mirror mount 205 and the first light blocking member 206 are driven upward and downward can be reduced immediately before the completion of the sub-mirror driving, whereby it is possible to reduce shock and noise due to a collision of the constituent elements.

The operation of the sub-mirror driving and the light blocking device according to the second embodiment of the present invention is as described above.

According to the second embodiment, there is provided an arrangement which includes a light blocking member arranged to block a part of a light flux during non-exposure and to be retracted from an optical path during exposure in interlocked relationship to the retracting operation of a sub-mirror provided for conducting the light flux toward a focus detecting device. The light blocking member, when retracted, is inclined with respect to an optical axis. Accordingly, it is possible to prevent the interference between the light flux and the light blocking member without increasing the entire size of a camera.

According to the second embodiment, the light flux to be conducted toward the focus detecting device is inclined toward a photographic lens, and the light blocking member is retracted so that it can be approximately perpendicular to the optical axis of the light flux. Accordingly, it is possible to efficiently prevent interference with an effective light flux. In addition, since the focus detecting device does not need to be disposed at a very low position, it is possible to prevent an increase in the entire size of the camera.

According to the second embodiment, the abutment portion of the first light blocking member and the cam shape of the cam face 208b are constructed so that, when the sub-mirror is placed in its photography standby (mirror-up) position, a force acting to hold the first light blocking member can act in the same direction as an urging force which holds the sub-mirror mount in its standby position. Accordingly, it is not necessary to strengthen the urging force which holds the sub-mirror mount in the standby position, and it is possible to prevent problems such as the deformation of the sub-mirror due to the urging force or the instability of the position or angle at which to stop the sub-mirror mount.

Figure 12:
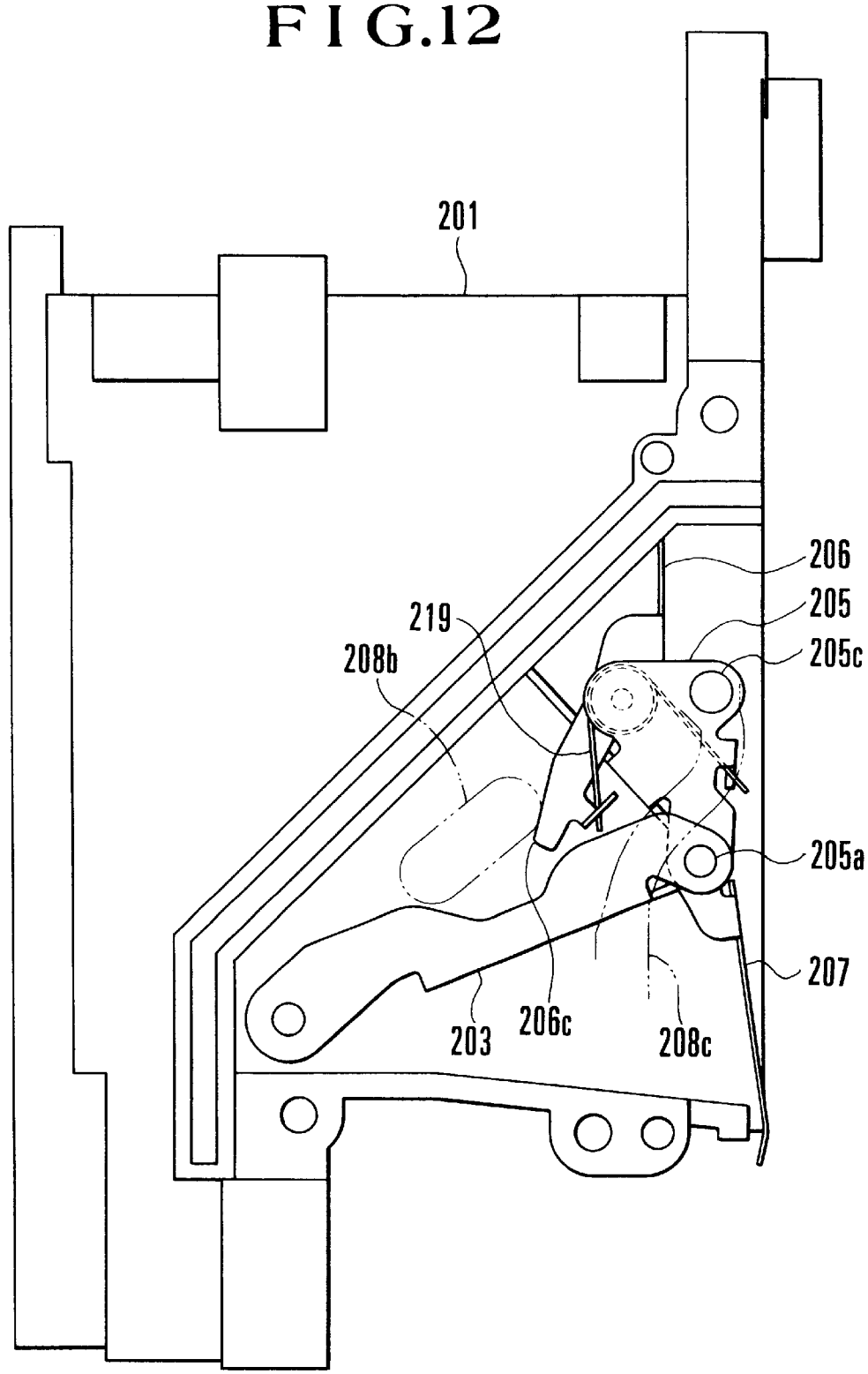
FIG. 12 is a schematic view aiding in explaining the driving mechanism of a camera according to a third embodiment of the present invention.
Figure 13:
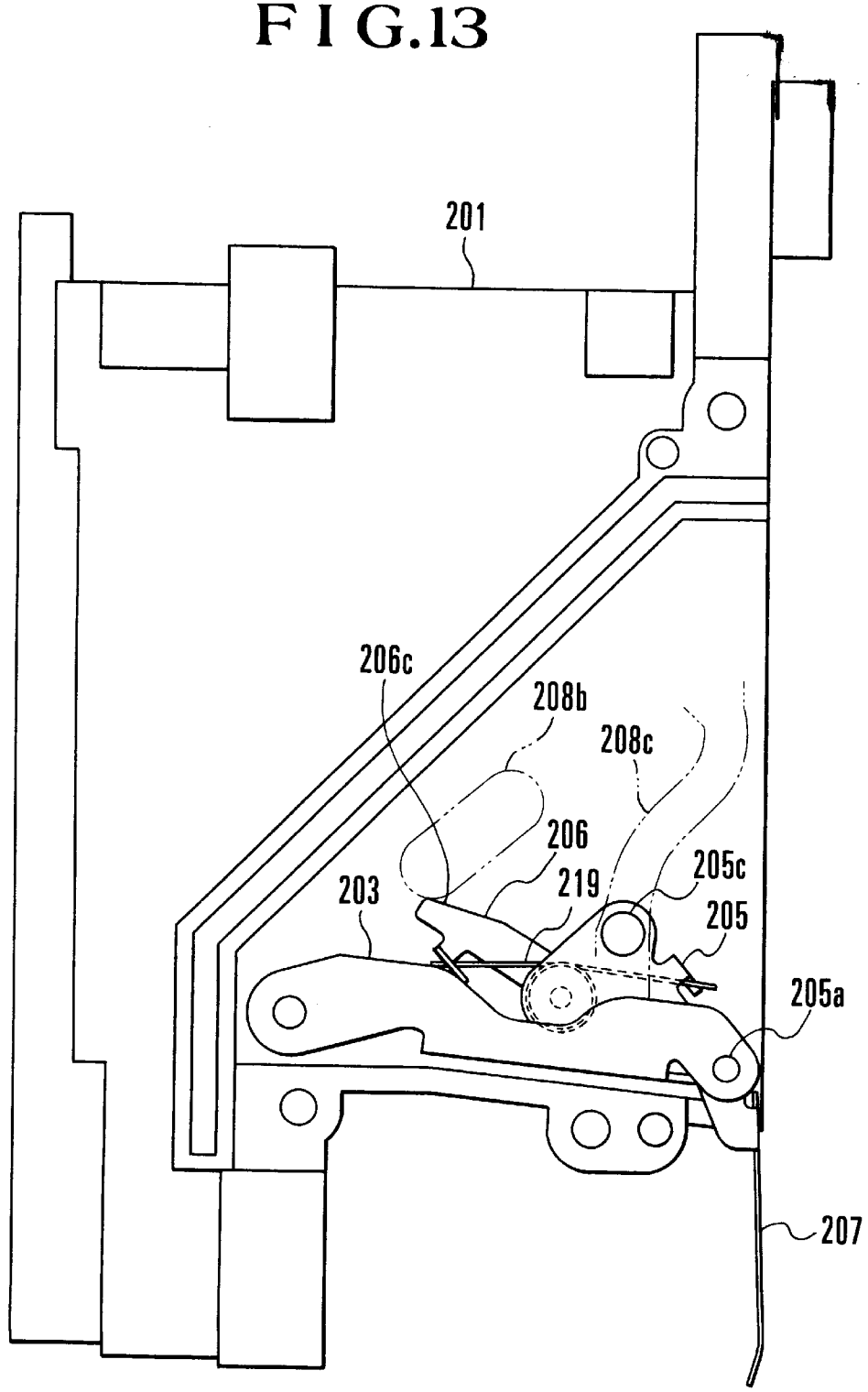
FIG. 13 is a schematic view aiding in explaining the driving mechanism of the camera according to the third embodiment of the present invention.

FIGS. 12 and 13 show a third embodiment. In the third embodiment, the aforesaid respective urging springs for holding the sub-mirror mount in the exposure-preventing state at the mirror-up position and in the exposure-permitting retracted state at the mirror-down position are eliminated and the toggling force of a light blocking mechanism is used instead of the urging springs.

FIG. 12 shows a mirror-up state in which a rotational force acts on the first light blocking member 206 in the clockwise direction with respect to the sub-mirror mount 205 by means of the spring 219. The driving portion, or abutment portion, 206c of the first light blocking member 206 is held in the shown state by being brought in abutment with the cam face 208b of the base plate 208. During this time, the reaction to the urging force, which is produced in the first light blocking member 206, acts on a portion above the hinge portion 205a of the sub-mirror mount 205, so that the reaction acts on the sub-mirror mount 205 as a clockwise rotational force. Accordingly, the sub-mirror mount 205 is urged toward the standby position. For this reason, the spring 217 for urging the sub-mirror mount 205 toward the mirror-up position, which is provided in the second embodiment, can be eliminated, whereby a further cost reduction can be realized.

FIG. 13 shows a mirror-down state. Even in the mirror-down state, the abutment portion 206c of the first light blocking member 206 is maintained in abutment with the cam face 208b of the base plate 208. The reaction of the abutment portion 206c acts as a counterclockwise rotational force with respect to the hinge portion 205a of the sub-mirror mount 205, whereby the sub-mirror mount 205 can be held in the retracted state. For this reason, the spring 218 for holding the sub-mirror mount 205 in the mirror-down position, which is provided in the second embodiment, can be eliminated, whereby a further cost reduction can be realized.

As is apparent from the above description, the constituent elements are arranged so that the driving force of the first light blocking member acts as a force which causes the sub-mirror mount to move upward, during the mirror-up state, and as a force which causes the sub-mirror mount to move downward, during the mirror-down state. Accordingly, the respective springs for holding the sub-mirror mount in the mirror-up and mirror-down positions can be eliminated, whereby a further cost reduction can be realized.

What is claimed is:

1. A camera, comprising:

a fixed first mirror for both reflecting a light flux and transmitting the light flux therethrough;

a second mirror for reflecting a part of the light flux transmitted through said first mirror toward a particular device;

a support member for supporting said second mirror so as to be below said first mirror and to move between a non-exposure position and a mirror retracted position indently of said first mirror; and a light blocking member movable in interlocked relationship to a movement of said support member in such a manner that, when said second mirror is located at said non-exposure position, said light blocking member is located at a light blocking position at which said light blocking member blocks at least a part of the light flux transmitted through said first mirror which is not incident on said second mirror or said support member, and, when said second mirror is retracted to said mirror-retracted position, said light blocking member moves to a retracted position at which said light blocking member is retracted from said light blocking position.

2. A camera according to claim 1, wherein said light blocking member includes a plurality of light blocking members.

3. A camera according to claim 2, wherein said plurality of light blocking members, when located at said light blocking position, are located above and below said second mirror.

4. A camera according to claim 1, wherein said second mirror, when located at said mirror-retracted position, is moved to a bottom portion of said camera, and said light blocking member, when located at said retracted position, is moved to said bottom portion of said camera.

5. A camera according to claim 4, wherein said light blocking member, when located at said retracted position, is moved to a position lower than said second mirror.

6. A camera according to claim 4, wherein said light blocking member, when located at said retracted position, is moved to a position parallel to said second mirror.

7. A camera according to claim 1, wherein said light blocking member, when located at said retracted position, is inclined with respect to an exposure optical axis.

8. A camera according to claim 7, wherein an optical axis of the light flux reflected by said second mirror when said second mirror is located at said non-exposure position is inclined toward a photographic lens, and an angle of inclination of said retracted position of said light blocking member is coincident with an angle of inclination of said light flux reflected by said second mirror.

9. A camera according to claim 1, further comprising a spring for urging said light blocking member to said light blocking position, said spring simultaneously urging said second mirror to said non-exposure position.

10. A camera according to claim 9, wherein said spring urges said second mirror toward said non-exposure position when said second mirror is located at said non-exposure position, while when said second mirror is located at said mirror-retracted position, said spring urges said second mirror toward said mirror-retracted position.

* * * * *

UNITED STATES PATENT AND TRADEMARK OFFICE
CERTIFICATE OF CORRECTION

PATENT NO. : 5,980,122
DATED : November 9, 1999
INVENTOR(S) : Masaki Higashihara, et al.

It is certified that error appears in the above-identified patent and that said Letters Patent is hereby corrected as shown below:

Col. 9, line 12, delete "indently" and insert -- independently --.

Signed and Sealed this

Tenth Day of April, 2001

Attest:

NICHOLAS P. GODICI

Attesting Officer     Acting Director of the United States Patent and Trademark Office